(12) United States Patent
Golgiri et al.

(10) Patent No.: US 10,787,124 B2
(45) Date of Patent: *Sep. 29, 2020

(54) METHODS AND APPARATUS TO FACILITATE PEDESTRIAN DETECTION DURING REMOTE-CONTROLLED MANEUVERS

(71) Applicant: Ford Global Technologies, LLC, Dearborn, MI (US)

(72) Inventors: Hamid M. Golgiri, Livonia, MI (US); Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,663

(22) Filed: Jul. 26, 2019

(65) Prior Publication Data

US 2020/0070721 A1 Mar. 5, 2020

Related U.S. Application Data

(63) Continuation of application No. 16/121,078, filed on Sep. 4, 2018, now Pat. No. 10,384,605.

(51) Int. Cl.
| | |
|---|---|
| *B60Q 9/00* | (2006.01) |
| *G05D 1/00* | (2006.01) |
| *B60T 7/12* | (2006.01) |
| *B60Q 5/00* | (2006.01) |
| *B60Q 1/50* | (2006.01) |
| *B60T 7/22* | (2006.01) |
| *B60T 7/20* | (2006.01) |

(52) U.S. Cl.
CPC ............... *B60Q 9/008* (2013.01); *B60Q 1/50* (2013.01); *B60Q 5/006* (2013.01); *B60T 7/12* (2013.01); *B60T 7/20* (2013.01); *B60T 7/22* (2013.01); *G05D 1/0011* (2013.01); *B60T 2230/08* (2013.01); *G05D 2201/0213* (2013.01)

(58) Field of Classification Search
CPC ................................ G08G 1/167; B60D 1/481
See application file for complete search history.

(56) References Cited

U.S. PATENT DOCUMENTS

| | | | |
|---|---|---|---|
| 9,233,710 B2 | 1/2016 | Lavoie et al. | |
| 9,493,187 B2 | 11/2016 | Pilutti et al. | |
| 9,616,923 B2 | 4/2017 | Lavoie et al. | |
| 9,914,333 B2 | 3/2018 | Shank et al. | |

(Continued)

FOREIGN PATENT DOCUMENTS

GB 2344481 A 6/2000

*Primary Examiner* — Fabricio R Murillo Garcia
(74) *Attorney, Agent, or Firm* — Frank Lollo; Eversheds Sutherland (US) LLP

(57) ABSTRACT

Methods and apparatus are disclosed to facilitate pedestrian detection during remote-controlled maneuvers. An example vehicle comprises external indicators and a processor and memory. The processor and memory are in communication with the external indicators and a remote device. The processor is configured to: determine whether the remote device is in a travel zone related to the vehicle; determine a risk assessment if the remote device is in the travel zone; and communicate a warning based on the risk assessment via the external indicators.

19 Claims, 11 Drawing Sheets

(56) References Cited

U.S. PATENT DOCUMENTS

| | | | | |
|---|---|---|---|---|
| 2011/0190972 A1* | 8/2011 | Timmons | ............... | G01C 21/34 |
| | | | | 701/31.4 |
| 2011/0253463 A1* | 10/2011 | Smith | ...................... | B60D 1/00 |
| | | | | 180/11 |
| 2013/0109342 A1* | 5/2013 | Welch | .................... | B60N 2/002 |
| | | | | 455/404.2 |

* cited by examiner

METHODS AND APPARATUS TO FACILITATE PEDESTRIAN DETECTION DURING REMOTE-CONTROLLED MANEUVERS

CROSS-REFERENCE TO RELATED APPLICATIONS

This application is a continuation of U.S. patent application Ser. No. 16/121,078 filed Sep. 4, 2018, which is herein incorporated by reference in its entirety.

TECHNICAL FIELD

The present disclosure generally relates to automated vehicle features and, more specifically, remote-controlled vehicle maneuvers and pedestrian detection.

BACKGROUND

In recent years, vehicles have been equipped with automated vehicle maneuvering features such as parallel parking assistance, trailer-hitching assistance, braking assistance, etc. Automated vehicle maneuvering features often make vehicles more enjoyable to drive, alert drivers to potential obstructions, and/or assist drivers in making relatively precise maneuvers. Information from automated vehicle maneuvering features is often presented to a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises: external indicators and a processor and memory. The processor and memory are in communication with the external indicators and a remote device. The processor is configured to: determine whether the remote device is in a travel zone related to the vehicle; determine a risk assessment if the remote device is in the travel zone; and communicate a warning based on the risk assessment via the external indicators.

An example method is disclosed. The method comprises: determining, with a processor, whether a remote device is in a travel zone related to a vehicle; determining, with the processor, a risk assessment if the remote device is in the travel zone; and communicating, with external indicators of the vehicle, a warning based on the risk assessment to a driver.

An example system is disclosed. The system comprises: a mobile device; a key fob; and a vehicle. The vehicle comprises wheels; external indicators; and a processor and memory. The processor and memory are in communication with the mobile device, the remote device, and the external indicators. The processor is configured to: control the wheels based on signals from the mobile device; determine whether the remote device is in a travel zone related to the vehicle; determine a risk assessment if the remote device is in the travel zone; and communicate a warning based on the risk assessment via one or more of the external indicators and the mobile device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
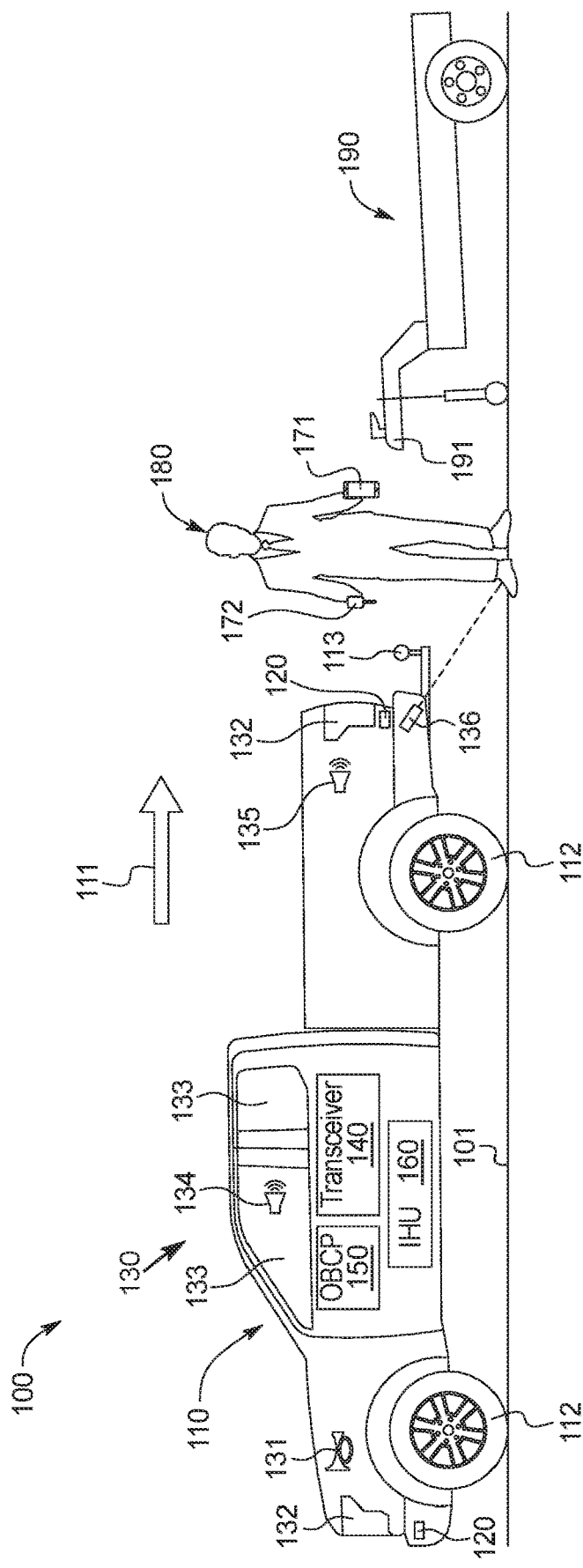
FIG. 1 is a side schematic view of a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Automated vehicle maneuvering features include parallel parking assistance, trailer-hitching assistance, and braking assistance, among others. Parallel parking assistance detects and steers a vehicle into a parallel parking spot. Trailer-hitching assistance detects and steers a vehicle to a trailer hitch coupler. Braking assistance automatically slows and/or stops a vehicle when a pedestrian or other obstruction is detected near a vehicle.

Traditionally, with trailer-hitching assistance, a vehicle detects a hitch coupler of a trailer and a driver commands vehicle motion from the driver's seat by holding down a button. While the button is held, the vehicle reverses toward the trailer. However, this precludes the driver from monitoring a potential height mismatch between the vehicle's towing tongue and the trailer's hitch coupler. In some instances, the hitch coupler may be lower than the towing tongue. In some such instances, the vehicle must then be moved away from the trailer, the trailer raised, and the trailer-hitching assistance process repeated.

This disclosure provides methods and apparatus to remotely control vehicle maneuvers and detect pedestrians. By remotely controlling vehicle maneuvers, a driver may adjust a trailer hitch coupler's height before the vehicle arrives at the trailer. By detecting pedestrians, the vehicle may be stopped and/or provide a warning before the driver or other pedestrian is caught between the vehicle and the trailer.

Figure 2:
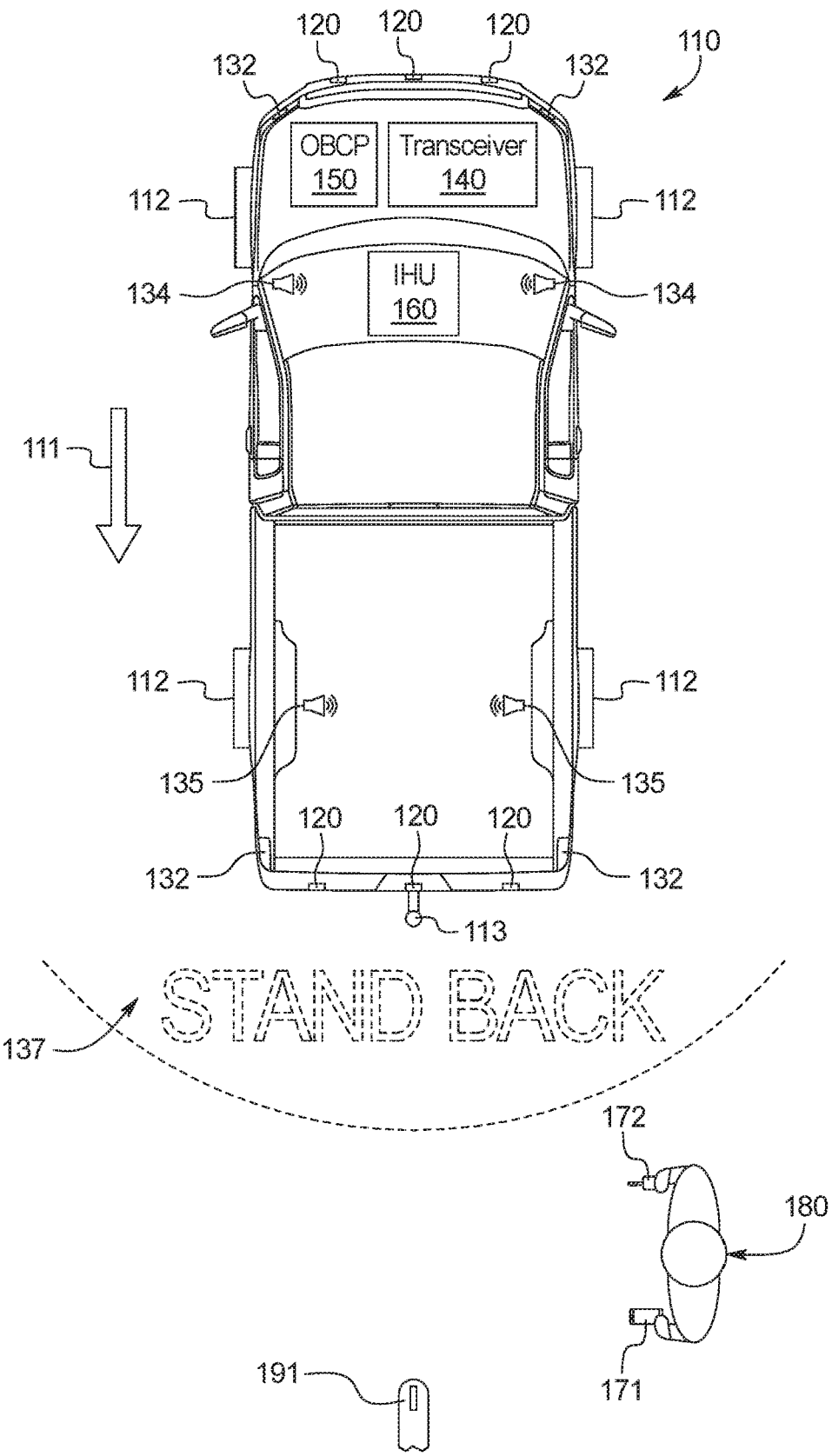
FIG. 2 is a top schematic view of the vehicle of FIG. 1.

FIG. 1 is a side schematic view of a vehicle 110 operating in in an environment 100. FIG. 2 is a top schematic view of the vehicle 110.

As shown in FIG. 1, the environment 100 includes a roadway 101, the vehicle 110, the mobile device 171, a key fob 172, a driver 180, and a trailer 190. An arrow 111 shown in FIG. 1 indicates that the vehicle 110 is traveling in reverse toward the trailer 190. In the example of FIG. 1, the driver 180 is between the vehicle 110 and the trailer 190 to monitor the vehicle's 110 progress toward the trailer 190. The vehicle 110 detects the trailer 190, determines a path to the trailer, and steers itself toward the trailer 190. The driver 180 controls the vehicle's 110 speed along the path via the mobile device 171. In some examples, the driver 180 controls the vehicle's 110 speed by commanding the vehicle 110 to either stop (e.g., zero speed) or move at a set predetermined speed (e.g., 3 miles per hour, 5 miles per hour, etc.).

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIG. 1 the vehicle 110 includes wheels 112, a towing ball 113, sensors 120, external indicators 130, a transceiver 140, an on board computing platform (OBCP) 150, and an infotainment head unit (IHU) 160.

The trailer 190 includes a hitch coupler 191. The hitch coupler 191 is configured to receive and secure about the towing ball 113. Thus, the trailer 190 may be swingably connected to the vehicle 110 via the towing ball 113 and the hitch coupler 191.

The vehicle 110 is in communication with the mobile device 171 and the key fob 172 via the transceiver 140.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. For example, such sensors 120 may include accelerometers, odometers, tachometers, pitch and yaw sensors, wheel speed sensors, microphones, tire pressure sensors, and biometric sensors, etc. In the illustrated example, the sensors 120 are object-detecting and range-finding sensors (e.g., a camera, LIDAR, RADAR, ultrasonic, etc.). In some examples, the sensors 120 are mounted at the front and rear of the vehicle 110. The sensors 120 detect objects (e.g., the trailer 190, the driver 180, etc.) about the vehicle 110. In other words, the sensors 120 generate obstruction information for the vehicle 110.

The external indicators 130 include a horn 131, headlights and taillights 132, windows 133, internal speakers 134, external speakers 135, and a puddle lamp 136. The external indicators 130 may be used to generate an escalating series of warnings for the driver 180 and/or other pedestrians between the vehicle 110 and the trailer 190 as the vehicle 110 reverses toward the trailer 190.

The horn 131, internal speakers 134, and the external speakers 135 generate audio warnings (e.g., horn chirps, horn blasts, pre-recorded spoken messages, etc.). In some examples, the windows 133 are opened to aid in making an audio warning produced by the internal speakers 134 more audible to the driver 180 and/or other pedestrians outside the vehicle 110.

The headlights and taillights 132 and the puddle lamp 136 generate visual warnings (e.g., light flashes, light displays, etc.). In some examples, the puddle lamp 136 casts a lighted image 137 on the roadway 101 during a remote-controlled auto-hitch maneuver, as shown in FIG. 2. The image 137 may include an outline of an area behind the vehicle 110 out of which the driver 180 and/or other pedestrians should stay. The image 137 may include a written message warning the driver 180 and/or other pedestrians to stay away from behind the vehicle 110. The puddle lamp 136 may be any type of light source (e.g., light-emitting diode, incandescent, laser, etc.).

The example transceiver 140 includes antenna(s), radio(s) and software to broadcast messages and to establish connections between the vehicle 110, the key fob 172, and the mobile device 171.

The OBCP 150 controls various subsystems of the vehicle 110. In some examples, the OBCP 150 controls power windows, power locks, an immobilizer system, and/or power mirrors, etc. In some examples, the OBCP 150 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the OBCP 150 processes information from the sensors 120 to execute and support remote-control vehicle maneuvering features and automated vehicle maneuvering features. Using obstruction information provided by the sensors 120, the OBCP 150 determines a path for the vehicle to follow to the trailer 190, determines whether to warn the driver 180 and/or other pedestrians of the vehicle 110's approach toward the trailer 190, and/or determines whether to stop the vehicle 110 before contacting an obstruction.

The infotainment head unit 160 provides an interface between the vehicle 110 and a user. The infotainment head unit 160 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 160 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 160 displays the infotainment system on, for example, the center console display. In some examples, the IHU 160 includes the internal speakers 134.

In the examples of FIGS. 1 and 2, the mobile device 171 is a remote device. The mobile device 171 may be, for example, a smartphone a cellular telephone, a tablet, etc. The mobile device 171 includes a transceiver to send and receive messages from the transceiver 140. In operation, during a remote-controlled auto-hitch maneuver, the mobile device 171 serves as a user interface for the driver 180 to control backward and/or forward movement of the vehicle 110. More specifically, the OBCP 150 determines and controls steering of the vehicle 110 and the driver 180 controls the rotation speed and rotation direction of the wheels 112 via the mobile device 171. As described above, in some examples, the driver 180 controls the rotation of the wheels 112 by commanding the wheels to either stop turning (e.g., zero rotation) or turn at a set predetermined value (e.g., 30 revolutions per minute, 50 revolutions per minute, etc.). In some examples, the rotation speed of the wheels 112 may be limited to a predetermined threshold during remote-controlled maneuvers.

In the examples of FIGS. 1 and 2, the key fob 172 is a remote device and includes a transceiver to send and receive messages from the transceiver 140. In operation, during a remote-controlled auto-hitch maneuver, the key fob 172 serves as a localizing device for the OBCP 150 to determine a location of the driver 180 in relation to the vehicle 110. More specifically, the OBCP 150 analyzes signals from the key fob 172 to determine a location of the key fob 172. The OBCP 150 may analyze signals from the key fob 172 via, for example, time-of-flight analysis, low-frequency signal strength analysis, low-energy signal strength analysis, angle of arrival analysis, dead reckoning, etc. It should be understood that the method used for localization of the driver 180 in relation to the vehicle 110 will determine how precisely the driver 180 can be located (e.g., low-frequency signal strength analysis may be less precise than time-of-flight analysis).

In some examples, the key fob 172 is combined into the mobile device 171 (e.g., "phone-as-key"). It should therefore be understood that, in such examples, the vehicle 110 tracks the location of the driver 180 via the mobile device 171.

Figure 3:
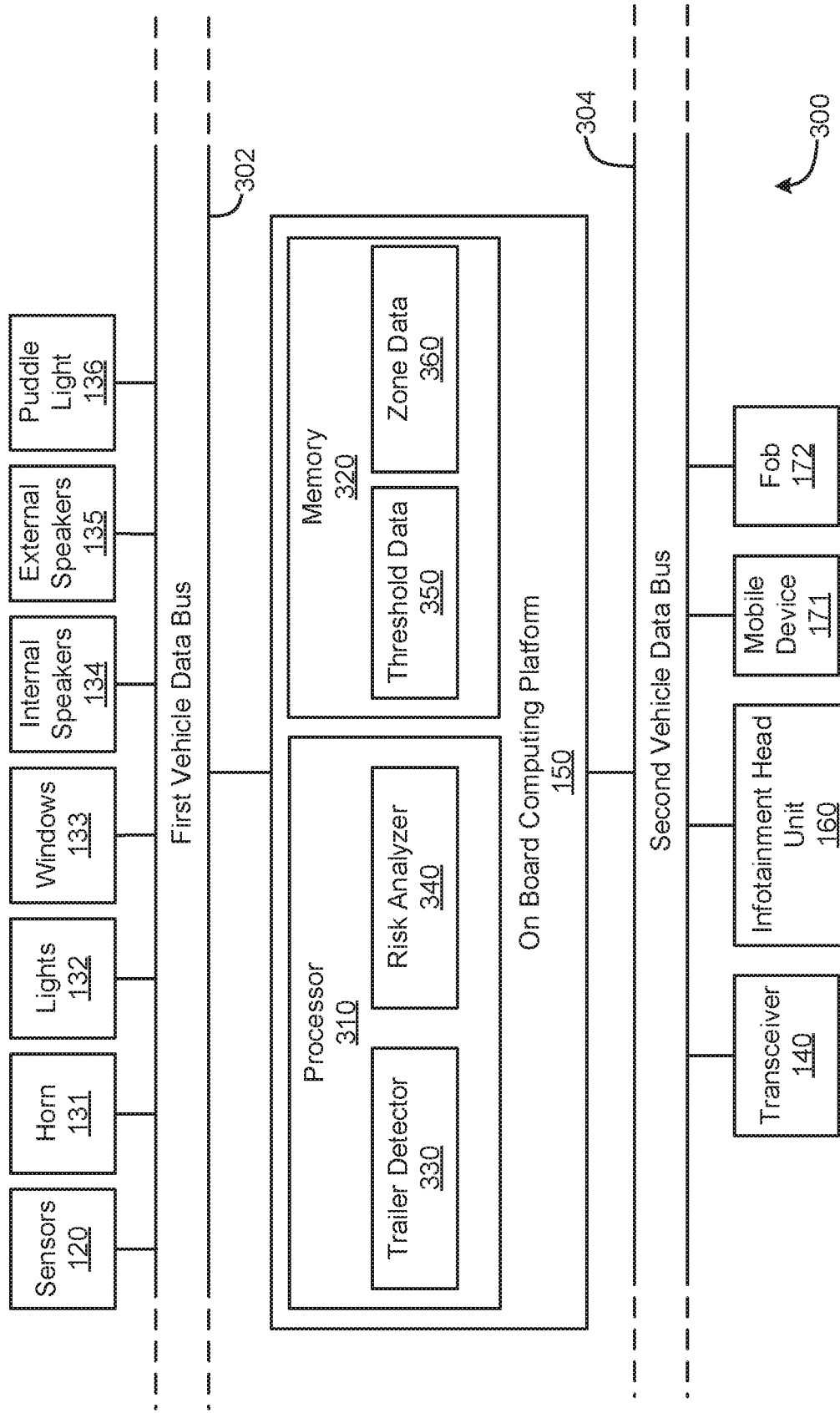
FIG. 3 is a block diagram of the electronic components of the vehicle of FIG. 1.
Figure 4:
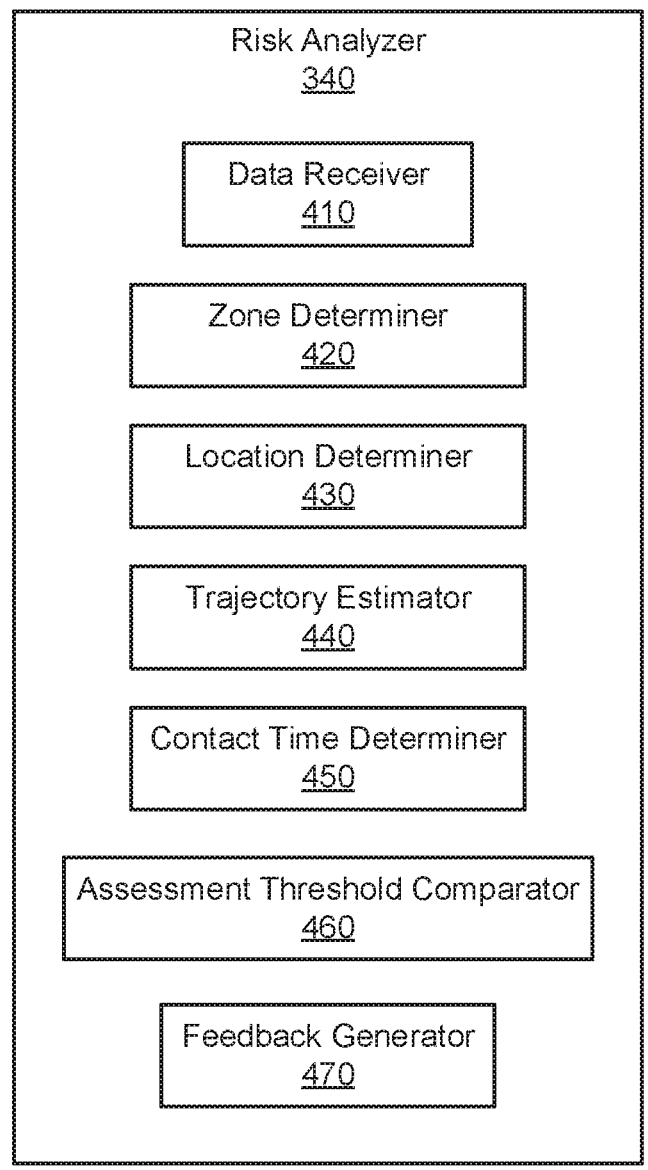
FIG. 4 is a more detailed block diagram of the risk analyzer of FIG. 3.
Figure 7:
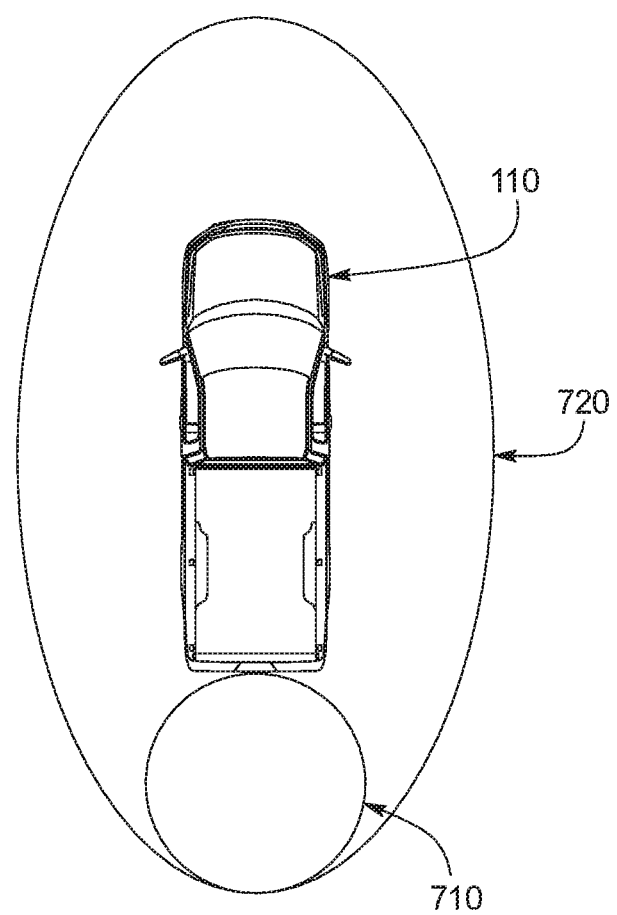
FIG. 7 illustrates another example travel zone defined by the risk analyzer of FIG. 3.
Figure 7:
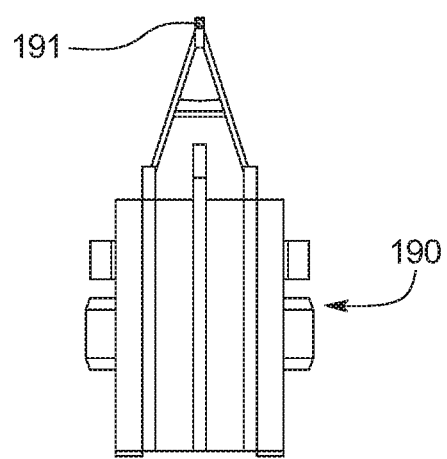
Figure 8:
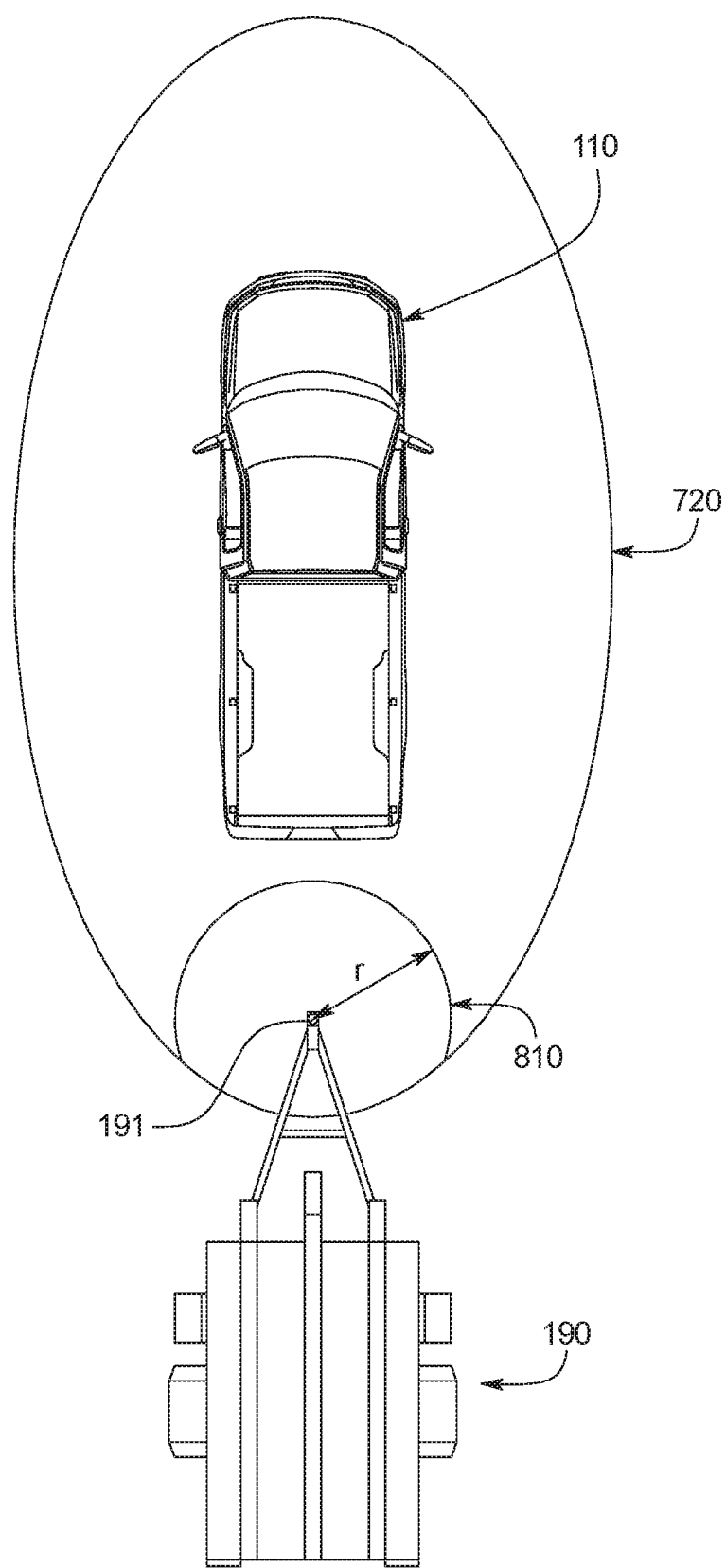
FIG. 8 illustrates another example travel zone defined by the risk analyzer of FIG. 3.
Figure 9:
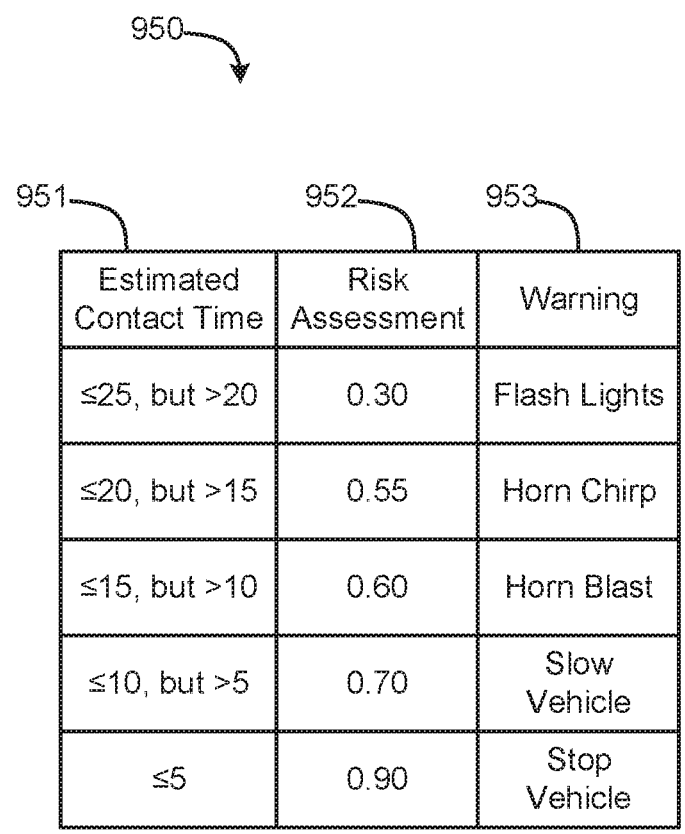
FIG. 9 is a look-up table stored in a memory of the electronic components of FIG. 8.
Figure 10:
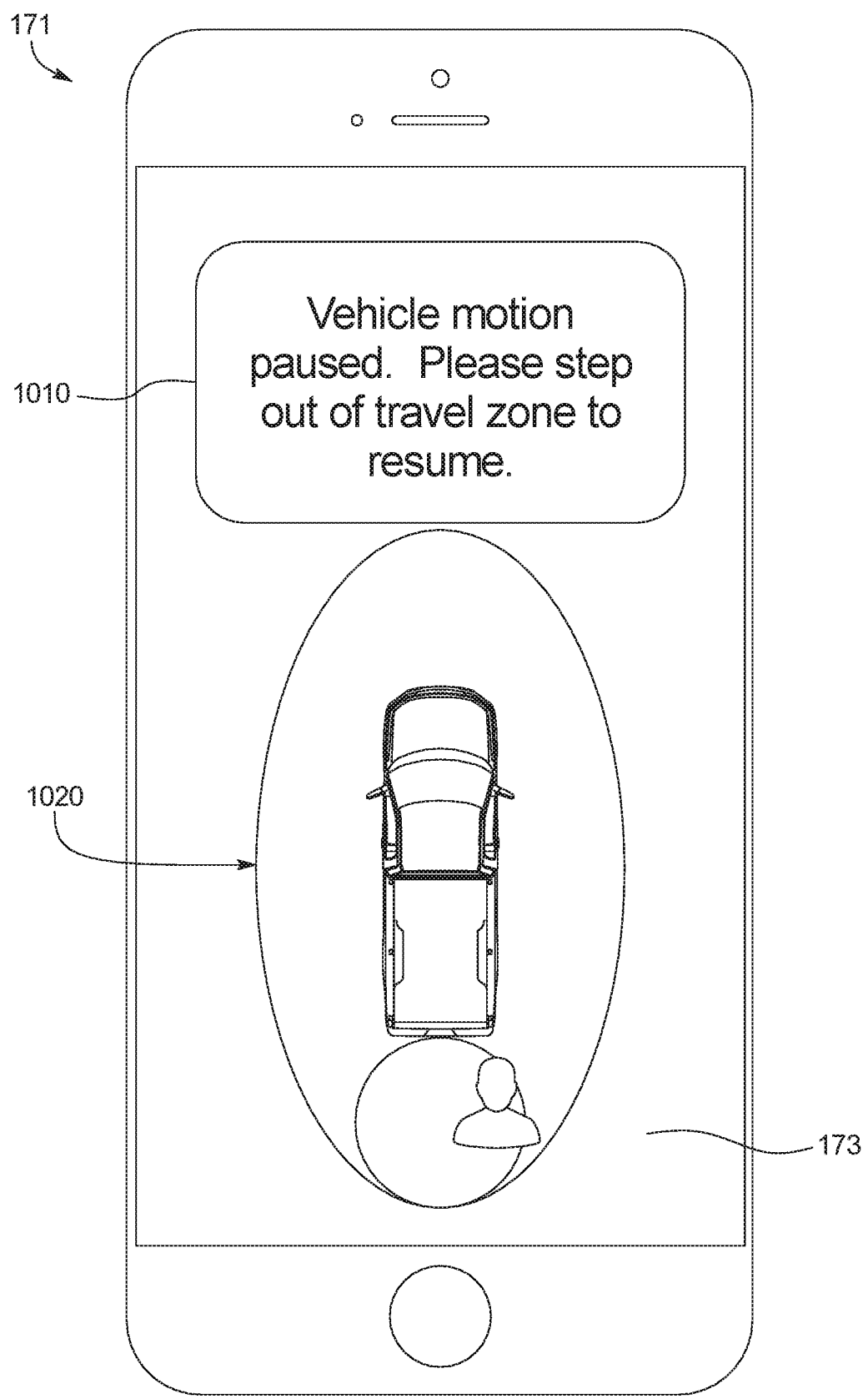
FIG. 10 illustrates a mobile device used to remotely control the vehicle of FIG. 1.

FIG. 3 is a block diagram of electronic components 300 of the vehicle 110. FIG. 4 is a more detailed block diagram of the risk analyzer 340 of FIG. 3. FIGS. 5-8 illustrate example travel zones 510, 610, 710, 810 defined by the risk analyzer 340. FIG. 9 is a look-up table 950 stored in a memory 320 of the electronic components 300. FIG. 10 illustrates the mobile device 171 used to remotely control the vehicle 110.

As shown in FIG. 3, the first vehicle data bus 302 communicatively couples the sensors 120, the horn 131, the lights 132, the windows 133, the internal speakers 134, the external speakers 135, the puddle lamp 136, the OBCP 150, and other devices connected to the first vehicle data bus 302. In some examples, the first vehicle data bus 302 is implemented in accordance with the controller area network (CAN) bus protocol as defined by International Standards Organization (ISO) 11898-1. Alternatively, in some examples, the first vehicle data bus 302 may be a Media Oriented Systems Transport (MOST) bus, a CAN flexible data (CAN-FD) bus (ISO 11898-7), or an Ethernet bus. The second vehicle data bus 304 communicatively couples the OBCP 150 the transceiver 140, the IHU 160, the mobile device 171, and the key fob 172. The second vehicle data bus 304 may be a MOST bus, a CAN bus, a CAN-FD bus, or an Ethernet bus. In some examples, the OBCP 150 communicatively isolates the first vehicle data bus 302 and the second vehicle data bus 304 (e.g., via firewalls, message brokers, etc.). Alternatively, in some examples, the first vehicle data bus 302 and the second vehicle data bus 304 are the same data bus.

The OBCP 150 includes a processor or controller 310 and memory 320. In the illustrated example, the OBCP 150 is structured to include a trailer detector 330 and the risk analyzer 340. Alternatively, in some examples, the trailer detector 330 and the risk analyzer 340 may be incorporated into another electronic control unit (ECU) with its own processor 310 and memory 320.

In operation, the trailer detector 330 locates the hitch coupler 191 of the trailer 190 and determines a path for the vehicle 110 to follow to move the towing ball 113 into place for coupling with the hitch coupler 191 based on obstruction information from the sensors 120. The trailer detector 330 communicates with the steering of the vehicle 110 to turn the wheels of the vehicle 110 toward the detected hitch coupler 191 of the trailer 190. The trailer detector 330 communicatively connects the powertrain of the vehicle 110 with the mobile device 171. Thus, the mobile device 171 may remotely control the rotational speed and direction of the wheels of vehicle 110.

In operation, the risk analyzer 340 defines travel zones 510, 610, 710, 810, locates the key fob 172, determines whether the key fob 172 is in range for remote control, determines whether the key fob 172 is inside the vehicle 110, determines whether the key fob 172 is in a travel zone 510, 610, 710, 810, estimates a trajectory of the driver 180 holding the key fob 172, determines a risk assessment of whether the vehicle 110 will contact the driver 180, and determines whether to present warnings to the driver 180 and/or stop the vehicle 110. The risk analyzer 340 makes these determinations and estimations based on obstruction information from the sensors 120 and signals from the key fob 172.

The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 320 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 320 includes multiple kinds of memory, particularly volatile memory and non-volatile memory.

The memory 320 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 320, the computer readable medium, and/or within the processor 310 during execution of the instructions. The memory 320 stores threshold data 350 and zone data 360.

Figure 6:
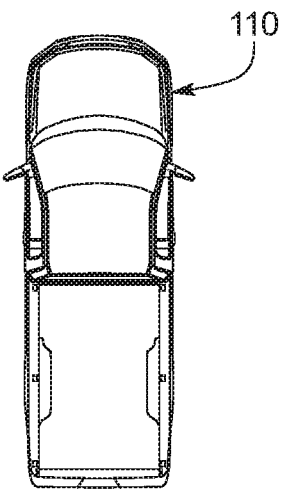
FIG. 6 illustrates another example travel zone defined by the risk analyzer of FIG. 3.
Figure 6:
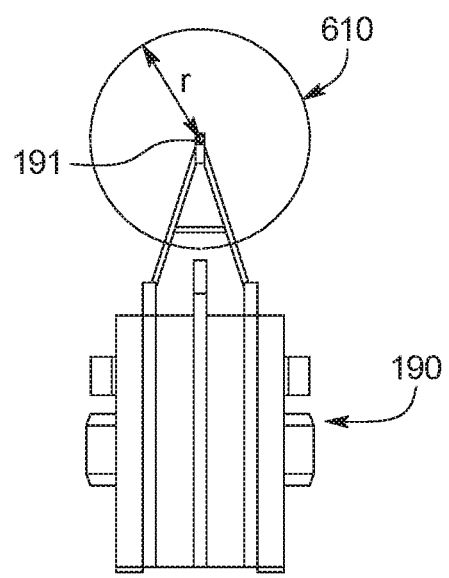

In some examples, the threshold data 350 includes the look up table 950. As shown in FIG. 9, the look up table 950 corresponds estimated contact time values 951 to risk assessment values 952 and to warnings 953 for the vehicle 110. In other words, the look up table 950 provides predetermined risk assessments 952 and corresponding warnings 953 for a given estimated contact time 951. As shown in the examples of FIG. 9, as the estimated contact times 951 decrease, the corresponding risk assessment values 952 increase and the disruptiveness of the warnings 953 increase. As shown in the example of FIG. 9, an estimated contact time of 25 seconds or less, but more than 20 seconds corresponds to a 0.30 risk assessment value 952 for which the vehicle 110 may flash the lights 132. As shown in the example of FIG. 9, an estimated contact time of 5 seconds or less corresponds to a 0.90 risk assessment value 952 for which the vehicle 110 may stop moving. In some examples, for a given risk assessment value 952, the vehicle 110 may generate the corresponding warning 953 and any of the preceding warnings 953. Thus, in such examples, for the 0.90 risk assessment value 952, the vehicle 110 may stop, flash the lights 132, chirp the horn 131, and/or blast the horn 131. Blasting the horn 131 refers to sounding the horn 131 for an extended period (e.g., 1 or more seconds, etc.). FIG. 6 shows additional examples of estimated contact time, risk assessment value, and warning correspondences. It should be understood and appreciated that the look up table 950 depicted in FIG. 9 is an abridged example and that a look up table stored in the memory 320 may include additional estimated contact times, risk assessment values, and warnings. It should also be understood that the look up table 950 may be updated when the vehicle 110 is serviced and/or during routine Over-the-Air (OTA) updates. Updates to the look up table 950 may be performed via the transceiver 140, the IHU 160, and/or an on board diagnostics (OBD) port of the vehicle 110.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

As shown in FIG. 4, the risk analyzer 340 includes a data receiver 410, a zone determiner 420, a location determiner 430, a trajectory estimator 440, a contact time determiner 450, an assessment threshold comparator 460, and a feedback generator 470.

In operation, the data receiver 410 receives obstruction information sent by the sensors 120, signals from the mobile device 171, and signals from the key fob 172. More specifically, the data receiver 410 receives images, reflections, and echoes of obstructions behind the vehicle 110 captured by the sensors 120. Additionally, the data receiver 410 receives strengths, arrival times, and arrival angles of the signals from the mobile device 171 and the key fob 172.

In operation, the zone determiner 420 defines a travel zone of the vehicle 110 out of which the driver 180 and other pedestrian are to stay. More specifically, the zone determiner 420 accesses the zone data 360 stored in the memory 320. The zone determiner 420 applies a predetermined travel zone to the vehicle 110 and/or the trailer 190 based on the zone data 360. In some examples, the travel zone has a minimum size. In some examples, the travel zone increases in size as the speed of the vehicle 110 increases and vice versa.

Figure 5:
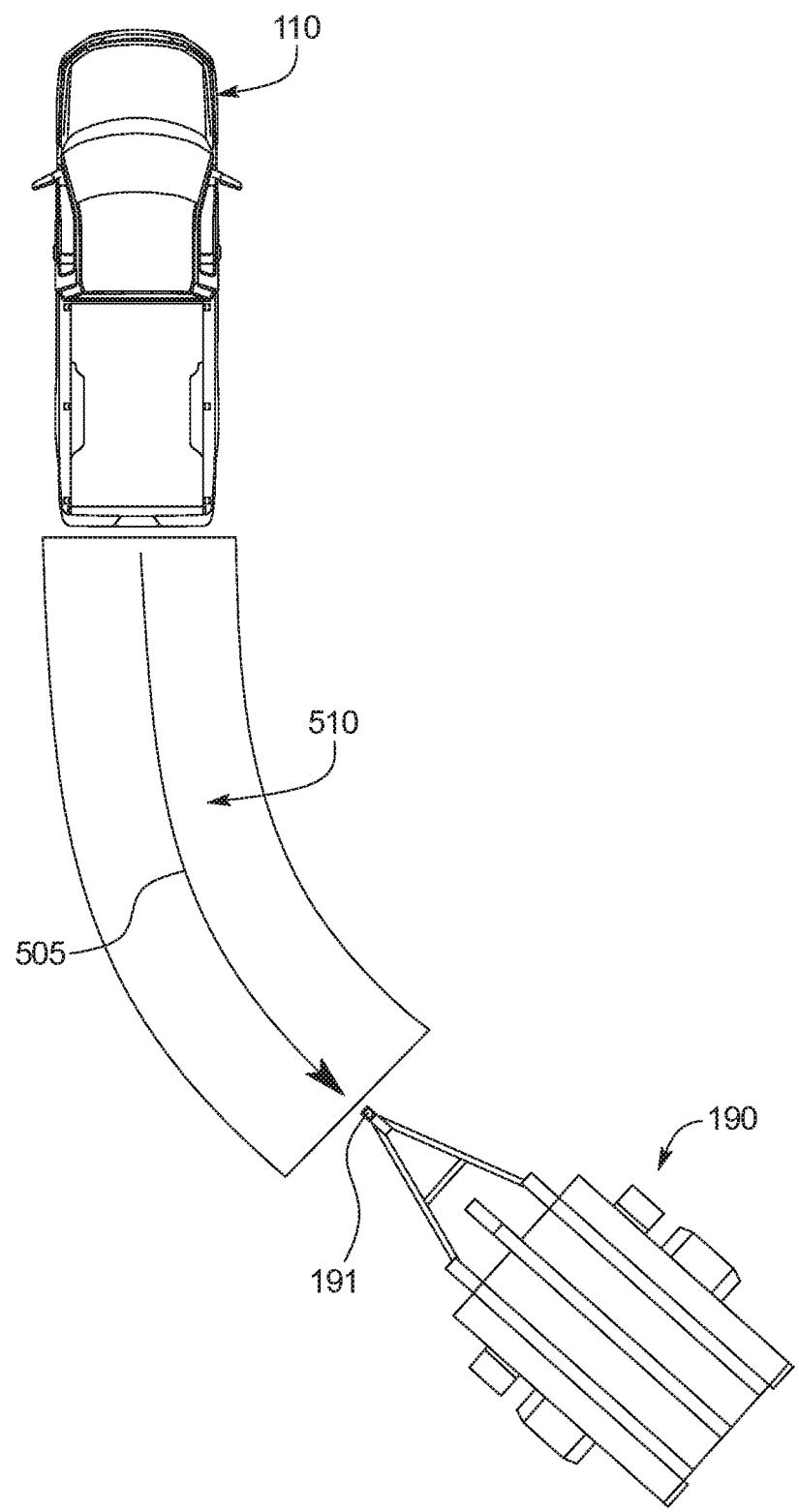
FIG. 5 illustrates an example travel zone defined by the risk analyzer of FIG. 3.

In some embodiments, the travel zone 510 is defined as an area through which the vehicle 110 passes while approaching the trailer 190, as shown in FIG. 5. More specifically, the trailer detector 330 detects the trailer 190 and determines a path 505 for the vehicle 110 to follow to approach the vehicle 110 to the hitch coupler 191. In this embodiment, the travel zone 510 covers locations through which the vehicle 110 will pass while following the path 505. Thus, in this embodiment, the travel zone 510 decreases in area as the vehicle 110 moves toward the trailer 190.

In some embodiments, the travel zone 610 is defined as an area within a specified radius r around the hitch coupler 191, as shown in FIG. 6. Thus, in this embodiment, the travel zone 610 is static.

Additionally, in some embodiments, the zone determiner 420 defines a control zone that the driver 180 must remain within to remotely control the vehicle 110. More specifically, the zone determiner 420 applies a predetermined control zone to the vehicle 110 based on the zone data 360 accessed from the memory 320. In some embodiments, the control zone 720 is an area within a predetermined distance (e.g., six meters, etc.) of the outermost portions of the vehicle 110, as shown in FIGS. 7 and 8. The outermost portions of the vehicle 110 are sometimes referred to as the skin of the vehicle 110.

In some embodiments, the travel zone 710 is defined as an area immediately behind the vehicle 110 and within the control zone 720, as shown in FIG. 7. Thus, in this embodiment, the travel zone 710 travels with the vehicle 110.

In some embodiments, the travel zone 810 is defined as an intersection of the control zone 720 about the vehicle 110 and an area within a specified radius r around the hitch coupler 191, as shown in FIG. 8. In other words, in such embodiments, the travel zone 810 is an area where the control zone 720 overlaps the radius r about the hitch coupler 191. Thus, the travel zone 810 increases in size as the vehicle 110 approaches the hitch coupler 191 and vice versa.

In operation, the location determiner 430 determines whether the driver 180 is within the defined travel zone and/or control zone. More specifically, the location determiner 430 analyzes signals from the key fob 172 to determine a location of the key fob 172 relative to the vehicle 110. In other words, the location determiner 430 localizes the key fob 172 to determine a location of the driver 180. Methods by which the location determiner 430 localizes the key fob 172 include, for example, time-of-flight analysis, signal strength analysis, angle of arrival analysis, dead reckoning, etc.

In some embodiments, once the location of the key fob 172 is determined, the location determiner 430 determines whether the key fob 172 is within the range of the control zone 720. In other words, the location determiner 430 compares the location of the key fob 172 to the defined control zone 720. In some embodiments, if the key fob 172 is outside of the control zone 720, the location determiner 430 pauses the remote-controlled vehicle maneuver. In some embodiments, if the key fob 172 is inside the vehicle 110, the location determiner 430 pauses the remote-controlled vehicle maneuver. Pausing the remote-controlled vehicle maneuver includes communicating with the powertrain of the vehicle 110 to stop the vehicle 110 and/or canceling the maneuver.

Further, the location determiner 430 determines whether the key fob 172 is within the travel zone. In other words, the location determiner 430 compares the location of the key fob 172 to the defined travel zone. It should be understood that the location determiner 430 searches for the key fob 172 repeatedly. In other words, the location determiner 430 analyzes the signals from the key fob 172 and determines the location of the key fob 172 according to a predetermined sample rate (e.g., 8 samples per second, 10 samples per second, 16 samples per second, etc.). Thus, the location determiner 430 updates the location of the key fob 172 when the driver 180 moves relative to the vehicle 110.

In operation, the trajectory estimator 440 estimates a trajectory of the driver 180 as the driver 180 moves relative to the vehicle 110. More specifically, the trajectory estimator 440 estimates a speed and direction at which the driver 180 is walking relative to the vehicle 110 based on the updated key fob 172 locations from the location determiner 430.

In operation, the contact time determiner 450 estimates when the vehicle 110 would hypothetically contact the driver 180 if the vehicle 110 continued to approach the trailer 190 and the driver 180 remained in the travel zone. More specifically, the contact time determiner 450 determines a closing speed at which the driver 180 and the vehicle 110 approach one another based on the estimated trajectory of the driver 180 from the trajectory estimator 440 and the speed at which the vehicle 110 approaches the trailer 190. Further, the contact time determiner 450 estimates a time period remaining until the vehicle 110 would hypothetically reach the driver 180 based on the closing speed. This remaining time period may be referred to as an estimated contact time. In other words, the contact time determiner 450 estimates how much time remains for the driver 180 move away from the vehicle 110 before hypothetically contacting the vehicle 110. It should be understood that the risk analyzer 340 is configured to stop the vehicle 110 before the vehicle 110 contacts the driver 180, as will be explained in greater detail below.

In operation, the assessment threshold comparator 460 selects a predetermined risk assessment value based on the estimated contact time from the contact time determiner 450. More specifically, the assessment threshold comparator 460 accesses the threshold data 350 (e.g., the look up table 950) stored in the memory 320. The assessment threshold comparator 460 compares the estimated contact time to threshold data 350 and selects the corresponding risk assessment value. Further, the assessment threshold comparator 460 selects the warning corresponding to the selected risk assessment value from the threshold data 350. In some embodiments, the assessment threshold comparator 460 additionally selects any other warnings corresponding to risk assessments having values lower than the selected risk assessment value.

In operation the feedback generator 470 generates feedback based on the selected warnings from the assessment threshold comparator 460. More specifically, the feedback generator 470 generates audio messages and/or visual messages warning a driver 180 of the approaching vehicle 110. Further, the feedback generator 470 sends the messages for display via the IHU 160, the lights 132, and/or the puddle lamp 136 and/or for announcement via the speakers 134, 135 and/or the horn 131. Additionally, the feedback generator 470 communicates with the powertrain of the vehicle 110 to slow or stop the vehicle 110.

Also, as shown in FIG. 10, the feedback generator 470 communicates warnings to the mobile device 171. More specifically, the feedback generator 470 sends messages 1010 and/or illustrations 1020 for display to the driver 180 via a display 173 of the mobile device 171. The message 1010 may include a text description of the status of the remote-control hitching process, a warning to exit the travel zone, and/or instructions to avoid contact with the vehicle 110. The illustration 1020 may depict the vehicle 110 and the driver 180 in the travel zone.

Figure 11:
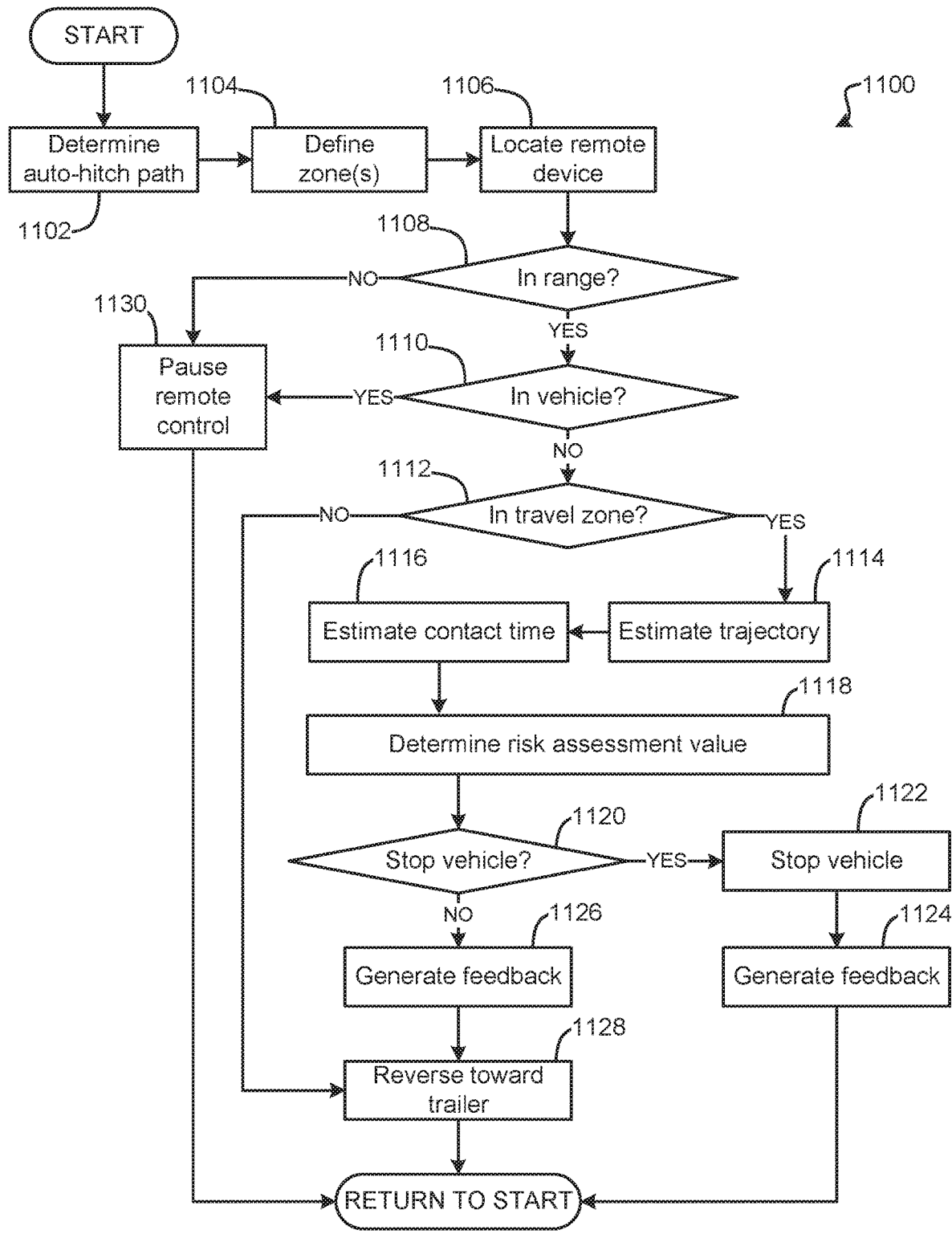
FIG. 11 is a flowchart of a method to prevent contact between the vehicle of FIG. 1 and a driver during a remote-controlled maneuver, which may be implemented by the electronic components of FIG. 3.

FIG. 11 is a flowchart of a method 1100 to prevent contact between the vehicle 110 and the driver 180 of FIG. 1 during a remote-controlled maneuver, which may be implemented by the electronic components 300 of FIG. 3. The flowchart of FIG. 11 is representative of machine readable instructions stored in memory (such as the memory 320 of FIG. 3) that comprise one or more programs that, when executed by a processor (such as the processor 310 of FIG. 3), cause the vehicle 110 to implement the example trailer detector 330 and risk analyzer 340 of FIGS. 3 and 4. Further, although the example program(s) is/are described with reference to the flowchart illustrated in FIG. 11, many other methods of implementing the example risk analyzer 340 may alternatively be used. For example, the order of execution of the blocks may be changed, and/or some of the blocks described may be changed, eliminated, or combined.

Initially, at block 1102, the trailer detector 330 determines a path for the vehicle 110 to follow to approach the trailer 190. As discussed above, the trailer detector 330 determines the path based on obstruction information from the sensors 120.

At block 1104, the zone determiner 420 defines a travel zone and, in some embodiments, a control zone related to the vehicle 110. More specifically, the zone determiner 420 accesses the zone data 360 stored in the memory 320 and applies a predetermined travel zone (e.g., one of the travel zones 510, 610, 710, 810) and a predetermined control zones (e.g., control zone 720) to the vehicle 110, as discussed above.

At block 1106, the location determiner 430 localizes the key fob 172. More specifically, the location determiner 430 analyzes wireless signals from the key fob 172 to determine a location of the key fob 172 relative to the vehicle 110, as discussed above.

At block 1108, the location determiner 430 determines whether the key fob 172 is in range. More specifically, the location determiner 430 compares the location of the key fob 172 to the defined the control zone 720, as discussed above.

If, at block 1108, the location determiner 430 determines that the key fob 172 is in range, the method 1100 proceeds to block 1110.

If, at block 1108, the location determiner 430 determines that the key fob 172 is out of range, the method 1100 proceeds to block 1130.

At block 1130, the location determiner 430 pauses the remote-controlled vehicle maneuver. More specifically, the location determiner 430 communicates with the powertrain of the vehicle 110 to stop the vehicle 110 and/or cancels the maneuver, as discussed above. The method 1100 then returns to block 1102.

At block 1110, the location determiner 430 determines whether the key fob 172 is in the vehicle 110, as discussed above.

If, at block 1110, the location determiner 430 determines that the key fob 172 is in the vehicle 110, the method 1100 proceeds to block 1130.

If, at block 1110, the location determiner 430 determines that the key fob 172 is out of the vehicle 110, the method 1100 proceeds to block 1112.

At block 1112, the location determiner 430 determines whether the key fob 172 is within the travel zone. More specifically, the location determiner 430 compares the location of the key fob 172 to the defined travel zone, as discussed above.

If, at block 1112, the location determiner 430 determines that the key fob 172 is not inside (i.e., outside) the travel zone, the method 1100 proceeds to block 1128.

If, at block 1112, the location determiner 430 determines that the key fob 172 is inside the travel zone, the method 1100 proceeds to block 1114.

At block 1114, the trajectory estimator 440 estimates a trajectory of the driver 180. More specifically, the trajectory estimator 440 estimates a speed and direction of the driver 180 holding the key fob 172 relative to the vehicle 110, as discussed above. The method 1100 proceeds to block 1116.

At block 1116, the contact time determiner 450 produces a contact time estimate of when the vehicle 110 will hypothetically contact the driver 180. More specifically, the contact time determiner 450 determines hypothetically how much time remains until the vehicle 110 contacts the driver 180 if the vehicle 110 were to continue approaching the trailer 190 and the driver 180 were to continue on his or her trajectory, as discussed above. The method 1100 proceeds to block 1118.

At block 1118, the assessment threshold comparator 460 compares the contact time estimate to predetermined risk assessment thresholds and corresponding warnings. More specifically, the assessment threshold comparator 460 accesses the threshold data 350 stored in the memory 320 and selects a risk assessment value according to the contact time estimate, as discussed above. The method 1100 proceeds to block 1120.

At block 1120, the assessment threshold comparator 460 determines whether to stop the vehicle 110 based on the selected risk assessment value. More specifically, the assessment threshold comparator 460 determines whether the warning corresponding to the selected risk assessment value includes stopping the vehicle 110, as discussed above.

If, at block 1120, the assessment threshold comparator 460 determines that the warning corresponding to the selected risk assessment value includes stopping the vehicle 110, the method 1100 proceeds to block 1122.

At block 1122, the feedback generator 470 stops the vehicle 110. More specifically, the feedback generator 470 communicates with the powertrain of the vehicle 110 to stop approaching the trailer 190, as discussed above. The method 1100 proceeds to block 1124.

At block 1124, the feedback generator 470 relays messages to the driver 180 that the remote-control maneuver is stopped. More specifically, the feedback generator 470 announces audio messages and/or displays visual messages via the vehicle 110 and/or the mobile device 171, as discussed above. The method 1100 then returns to block 1102.

If, at block 1120, the assessment threshold comparator 460 determines that the warning corresponding to the selected risk assessment value does not include stopping the vehicle 110, the method 1100 proceeds to block 1126.

At block 1126, the feedback generator 470 relays messages to the driver 180 that the driver 180 is the travel zone and/or instructing the driver 180 to move away from the vehicle 110. More specifically, the feedback generator 470 announces audio messages and/or displays visual messages via the vehicle 110 and/or the mobile device 171, as discussed above. The method 1100 then proceeds to block 1128.

At block 1128, the trailer detector 330 moves the vehicle 110 toward the hitch coupler 191 of the trailer 190. More specifically, the trailer detector 330 communicates with the steering and powertrain of the vehicle 110 and the mobile device 171 to guide the vehicle 110 via remote control, as discussed. The method 1100 then returns to block 1102.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid drivers by allowing drivers to remotely control their vehicle maneuvers while preventing contact between the driver and the vehicle. By allowing drivers to remotely control their vehicles, drivers may more closely observe the vehicle maneuver. In instances where the vehicle maneuver is assisted guidance toward a trailer hitch, the driver may observe whether the trailer hitch matches a vehicle towing in height. Thus, remote control of the assisted trailer guidance may prevent repetition of the trailer-hitching process, thereby saving time and associated fuel. Additionally, warning drivers of the approaching remote-controlled vehicle may remind drivers to be vigilant while performing vehicle maneuvers via remote control. It should also be appreciated that the disclosed apparatus and methods provide a specific solution—warning drivers of approaching remote-controlled vehicles—to a specific problem—potential contact between drivers, vehicles, and/or trailers during remote-controlled maneuvers. Further, the disclosed apparatus and methods provide an improvement to computer-related technology by increasing functionality of a processor to define travel and/or control zones related to a vehicle, determine a location of a driver outside of the vehicle, determine a trajectory of the driver, estimate a time remaining until a potential contact between the driver and the vehicle, select a risk assessment based on the estimated contact time, and generate warnings based on the risk assessment.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
external indicators;
a transceiver configured to remotely communicate with a mobile device associated with a vehicle operator; and
a processor and memory configured to:
receive, via the transceiver, a command signal from the mobile device associated with the vehicle operator for performance of autonomous maneuvers of the vehicle when the vehicle operator is outside the vehicle;
determine, upon receipt of the command signal from the mobile device, whether the mobile device, when associated with the vehicle operator, is identified to be in a travel zone of the vehicle;
determine a risk assessment for the vehicle operator in response to determining that the mobile device is identified to be in the travel zone; and
communicate, via the external indicators, a warning to the vehicle operator based on the risk assessment.

2. The vehicle of claim 1, wherein the processor is configured to estimate a trajectory of the vehicle operator associated with the mobile device.

3. The vehicle of claim 1, wherein the processor is configured to determine an estimated contact time remaining until the vehicle reaches the vehicle operator associated with the mobile device.

4. The vehicle of claim 3, wherein to determine the risk assessment, the processor is configured to select the risk assessment from a look up table of risk assessment values stored in the memory based on the estimated contact time.

5. The vehicle of claim 1, wherein the processor is configured to stop performance of the autonomous maneuvers of the vehicle based on the risk assessment.

6. The vehicle of claim 1, wherein the processor is configured to:
determine whether the mobile device is in a control zone related to the vehicle; and
pause performance of the autonomous maneuvers in response to determining that the mobile device is outside the control zone.

7. The vehicle of claim 1, wherein:
the external indicators include one or more of lights, a horn, speakers, and a puddle lamp; and
the warning includes one or more or of a horn chirp, a horn blast, and a light flash.

8. The vehicle of claim 1, wherein the processor is configured to communicate the warning to the mobile device via the transceiver.

9. The vehicle of claim 1, wherein the processor is configured to localize the mobile device based on communication with the transceiver via one or more of time-of-flight, signal strength, angle-of-arrival, and dead reckoning.

10. A method comprising:
receiving, with a transceiver of a vehicle, a command signal from a mobile device associated with a vehicle operator for performance of autonomous maneuvers of the vehicle while the vehicle operator is outside the vehicle;
determining, upon receipt of the command signal from the mobile device, whether the mobile device, when associated with the vehicle operator, is identified to be in a travel zone of the vehicle;
in response to determining that the mobile device is identified to be in the travel zone, determining, via a processor, a risk assessment for the vehicle operator; and
communicating, with the transceiver, a warning to the mobile device associated with the vehicle operator based on the risk assessment of the vehicle operator.

11. The method of claim 10, further comprising estimating, with the processor, a trajectory of the vehicle operator, wherein the vehicle operator is holding the mobile device.

12. The method of claim 10, further comprising determining, with the processor, an estimated contact time remaining until the vehicle reaches the mobile device associated with the vehicle operator.

13. The method of claim 12, wherein determining the risk assessment includes selecting, with the processor, the risk assessment from a look up table of risk assessment values based on the estimated contact time.

14. The method of claim 10, further comprising stopping, with the processor, performance of the autonomous maneuvers of the vehicle based on the risk assessment.

15. The method of claim 10, further comprising:
determining, with the processor, whether the mobile device is in a control zone related to the vehicle; and
pausing, with the processor, performance of the autonomous maneuvers of the vehicle in response to determining that the mobile device is outside the control zone.

16. The method of claim 10, further comprising communicating the warning to the vehicle operator via one or more external indicators of the vehicle.

17. The method of claim 16, wherein the one or more external indicators includes one or more of lights, a horn, speakers, and a puddle lamp.

18. The method of claim 16, wherein the warning includes one or more or of a horn chirp, a horn blast, and a light flash.

19. The method of claim 10, further comprising localizing the mobile device, with the processor, based on communication between the transceiver and the mobile device via one or more of time-of-flight, signal strength, angle-of-arrival, and dead reckoning.

* * * * *